United States Patent
Hills et al.

(10) Patent No.: US 10,120,351 B1
(45) Date of Patent: Nov. 6, 2018

(54) METHOD AND APPARATUS FOR COOLING COMPONENTS IN AN ELECTRONIC DEVICE

(71) Applicant: Western Digital Technologies, Inc., Irvine, CA (US)

(72) Inventors: Zachary P. Hills, Irvine, CA (US); Jeffrey F. Boigenzahn, Dana Point, CA (US); Robert G. Fairchild, Tustin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 575 days.

(21) Appl. No.: 13/957,814

(22) Filed: Aug. 2, 2013

Related U.S. Application Data

(60) Provisional application No. 61/839,793, filed on Jun. 26, 2013.

(51) Int. Cl.
*G05B 15/02* (2006.01)

(52) U.S. Cl.
CPC .................... *G05B 15/02* (2013.01)

(58) Field of Classification Search
USPC ........................................................ 700/300
See application file for complete search history.

(56) References Cited

U.S. PATENT DOCUMENTS

| | | | |
|---|---|---|---|
| 6,428,282 B1 | 8/2002 | Langley | |
| 7,451,332 B2 * | 11/2008 | Culbert | G06F 1/206 713/300 |
| 7,483,270 B2 | 1/2009 | Blake | |
| 7,490,479 B2 | 2/2009 | Byquist et al. | |
| 7,596,464 B2 * | 9/2009 | Hermerding | G06F 1/206 374/100 |
| 7,647,131 B1 * | 1/2010 | Sadowski | G05B 23/0297 700/108 |
| 8,295,991 B2 | 10/2012 | Chang et al. | |
| 8,368,329 B1 | 2/2013 | Depew et al. | |
| 8,386,205 B2 | 2/2013 | Lin | |
| 8,387,890 B2 | 3/2013 | Crocker et al. | |
| 2005/0288886 A1 * | 12/2005 | Therien | G06F 1/206 702/130 |
| 2011/0093132 A1 * | 4/2011 | Tan | G06F 1/206 700/299 |
| 2012/0078420 A1 | 3/2012 | Jensen et al. | |
| 2013/0100588 A1 | 4/2013 | Chang | |

* cited by examiner

*Primary Examiner* — Emilio J Saavedra
(74) *Attorney, Agent, or Firm* — Chang & Hale LLP

(57) ABSTRACT

An electronic device including electromechanical components, a cooling unit configured for heat removal for the electromechanical components, and a controller. The controller is configured to determine a system state of each of the electromechanical components based on temperature data for each of the electromechanical components and a temperature band corresponding to each of the electromechanical components, wherein the temperature data for each of the electromechanical components is sampled at a sample rate corresponding to each of the electromechanical components, determine a system state of the electronic device based on the system states of the electromechanical components, and control an operation of the cooling unit based on the system state of the electronic device.

19 Claims, 9 Drawing Sheets

| | EMC 1 | EMC 2 | EMC 3 |
|---|---|---|---|
| Sample Rate | 6 / min. | 2 / min. | 0.2 / min. |
| Temperature Band | 35°C – 40°C | 40°C – 50°C | 40°C - 45°C |

| System State | System Action |
|---|---|
| Extreme | Immediate system shutdown |
| Danger | Warn user and throttle system performance X° C hysteresis to clear warning & throttling |
| Hot | Cooling operation to maximum |
| Warm | Recommend cooling operation increase |
| Content | Maintain cooling operation |
| Cool | Recommend cooling operation decrease |

FIG. 2

EMC 1

| System State | System Action |
|---|---|
| Extreme | Immediate system shutdown |
| Danger | Warn user and throttle system performance X° C hysteresis to clear warning & throttling |
| Hot | Cooling operation to maximum |
| Warm | Increase cooling operation by 20% |
| Content | Maintain cooling operation |
| Cool | Decrease cooling operation by 20% |

FIG. 4

EMC 2

| System State | System Action |
| --- | --- |
| Extreme | Immediate system shutdown |
| Danger | Warn user and throttle system performance X°C hysteresis to clear warning & throttling |
| Hot | Cooling operation to maximum |
| Warm | Increase cooling operation by 15% |
| Content | Maintain cooling operation |
| Cool | Decrease cooling operation by 15% |

FIG. 5

EMC 3

| System State | System Action |
|---|---|
| Extreme | Immediate system shutdown |
| Danger | Warn user and throttle system performance X° C hysteresis to clear warning & throttling |
| Hot | Cooling operation to maximum |
| Warm | Increase cooling operation by 10% |
| Content | Maintain cooling operation |
| Cool | Decrease cooling operation by 10% |

FIG. 6

|  | EMC 1 | EMC 2 | EMC 3 |
|---|---|---|---|
| Sample Rate | 6 / min. | 2 / min. | 0.2 / min. |
| Temperature Band | 35°C – 40°C | 40°C – 50°C | 40°C - 45°C |

FIG. 8

METHOD AND APPARATUS FOR COOLING COMPONENTS IN AN ELECTRONIC DEVICE

CROSS-REFERENCE TO RELATED APPLICATIONS

This application claims the benefit of U.S. Provisional Application No. 61/839,793, filed on Jun. 26, 2013, entitled "FAN CONTROL SYSTEM," which is hereby incorporated by reference in its entirety.

BACKGROUND

Conventionally, a computer system has a cooling fan to cool the components of the computer system. A fan speed of the cooling fan may be increased or decreased depending on the temperature inside the computer system. For example, the fan speed of the cooling fan may be increased when the temperature is above a predetermined maximum temperature limit, and decreased when the temperature is not above the predetermined maximum temperature limit. However, this may cause the cooling fan to oscillate fan speeds. This may be undesirable due to the oscillation of the noise caused by the oscillation of the fan speeds. Furthermore, the different components of the computer system may have different cooling requirements, which may not be met by a single temperature reading to determine whether the fan speed of the cooling fan should be increased or decreased.

BRIEF DESCRIPTION OF THE DRAWINGS

The features and advantages of the present embodiments will become more apparent from the detailed description set forth below when taken in conjunction with the drawings, wherein:

FIG. 2 depicts system states and corresponding system actions for an electronic device according to an embodiment;

FIG. 4 depicts system states and corresponding system actions for an electromechanical component according to an embodiment;

FIG. 5 depicts system states and corresponding system actions for an electromechanical component according to an embodiment;

FIG. 6 depicts system states and corresponding system actions for an electromechanical component according to an embodiment;

FIG. 8 depicts sample rates and temperature bands for electromechanical components according to an embodiment.

DETAILED DESCRIPTION

Figure 1:
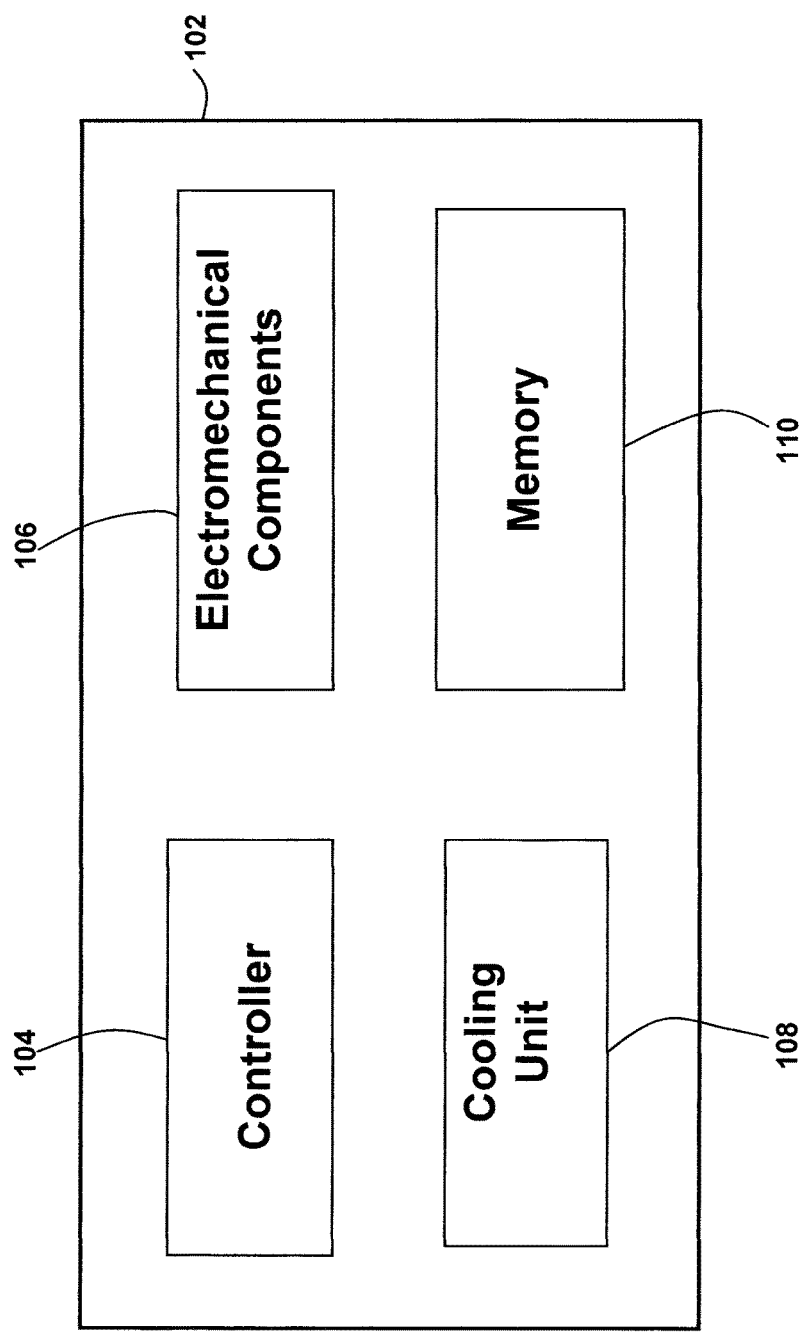
FIG. 1 depicts an electronic device according to an embodiment.

In an embodiment shown in FIG. 1, an electronic device 102 comprises a controller 104, electromechanical components 106, a cooling unit 108, and a memory 110. In an embodiment, the electronic device 102 comprises a network attached storage ("NAS") device, a direct attached storage ("DAS") device, a server, a computer, a laptop, an external storage system, a media player appliance, or any other processor or storage device based system which may have electromechanical components 106 which should be cooled.

In an embodiment, the controller 104 controls an operation of the cooling unit 108. The controller 104 can be, for example, a central processing unit ("CPU"), part of the CPU, integrated into the CPU, or separate from the CPU in the electronic device 102. In an embodiment, the cooling unit 108 comprises a fan, a cooling pump, any other device which can actively remove heat from the electromechanical components 106, or any combination thereof. In addition, the cooling unit 108 need not comprise only a single device, but instead could comprise multiple devices. For example, the cooling unit 108 can comprise multiple fans, a fan and a cooling pump, or other such combinations.

In an embodiment, the electromechanical components 106 comprise a controller, a central processing unit CPU, a hard disk drive, a solid state drive, a hybrid drive, a random access memory, a graphics controller, a power supply unit, a display unit, lighting devices, an optical drive, a sound system, or any other device which may generate heat and/or require cooling. In an embodiment, the hard disk drive comprises a magnetic recording disk. In an embodiment, the solid state drive comprises a solid state memory. In an embodiment, the memory 110 comprises at least one of a magnetic recording disk or a solid state memory. In an embodiment, the memory 110 comprises a flash memory.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In an embodiment, the controller 104 applies a cooling process to one or more of the electromechanical components 106. In an embodiment, the cooling process is stored in the memory 110. However, in an embodiment, the cooling process may be stored in a location external to the electronic device 102, but which is accessible by the controller 104. In an embodiment, the cooling process comprises a varying number of system states that are used to determine an overall cooling unit 108 behavior. In an embodiment, the cooling operation provided by the cooling unit 108 is gradually adjusted to hold the electromechanical components 106 within a target temperature range. Additional system states are provided in the event the system has begun to overheat or malfunction. In an embodiment, the use of the cooling process reduces the likelihood that the cooling unit 108 oscillates cooling operations, and can reduce the subsequent oscillation of noise for a user. For example, the use of the cooling process can reduce the oscillation of fan speeds, which can reduce the subsequent oscillation of noise for the user.

In an embodiment, the electronic device 102 comprises six predefined system states as shown in an embodiment in FIG. 2. Three system states (Extreme, Danger, and Hot) are utilized to denote different levels of overheating. The remaining three system states (Warm, Content, and Cool) denote different levels of normal or non-overheating operation. Each of the six predefined system states comprises a corresponding system action, which is shown in the embodiment in FIG. 2. Although six system states are shown in FIG. 2, additional, less, or even different system states may be utilized by the controller 104.

In the embodiment shown in FIG. 2, the system states are ranked with the extreme state being the highest ranked system state and the cool state being the lowest ranked system state. In an embodiment, although 6 system states are disclosed above, additional system states may be utilized with different corresponding system actions. Furthermore, in an embodiment, the system states may be ranked in a reverse order with extreme being the lowest ranked system state and the cool state being the highest ranked system state.

In an embodiment, the system action corresponding to the extreme system state comprises immediately shutting down the electronic device 102. In an embodiment, the system action corresponding to the danger system state comprises warning a user, throttling performance of the electronic device 102, or any combination thereof. In an embodiment, the system action corresponding to the hot system state comprises setting the cooling operation of the cooling unit 108 to a maximum setting.

In an embodiment, the system action corresponding to the warm system state comprises recommending a cooling operation increase for the cooling unit 108. In an embodiment, the system action corresponding to the content state comprises maintaining the cooling operation of the cooling unit 108. However, in an embodiment, the system action corresponding to the content state could comprise providing no recommendations. In an embodiment, the system action corresponding to the content state comprises recommending a cooling operation decrease for the cooling unit 108.

Figure 3:
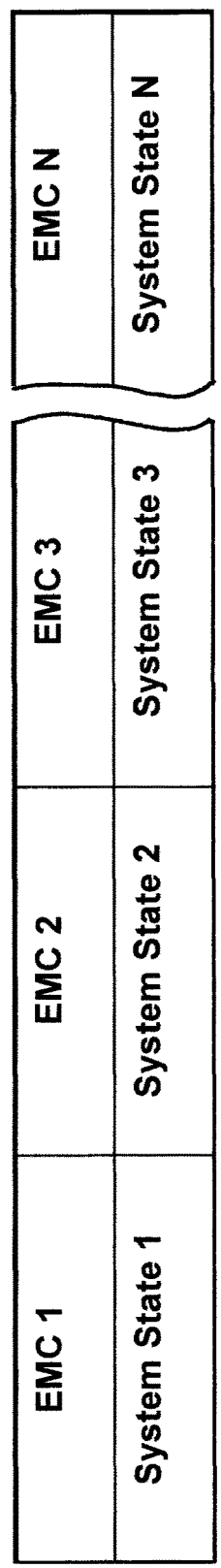
FIG. 3 depicts an array of system states for electromechanical components according to an embodiment.

In an embodiment, each of the electromechanical components 106 also comprises a system state. In an embodiment, the electromechanical components 106 comprise electromechanical components 1-N as shown in the embodiment in FIG. 3. The system state for each of the electromechanical components 106 is stored in an array shown in an embodiment in FIG. 3. For example electromechanical components 1-N may have system states 1-N. In an embodiment, the array is stored in the memory 110. However, in an embodiment, the array need not be stored in the memory 110. Instead, the array can be stored in a location external to the electronic device 102, but which is accessible by the controller 104.

In an embodiment, the electromechanical components need not have the same system action for the same system state as shown in FIGS. 4-6. In an embodiment, the different system actions reflect the different cooling requirements for each of the electromechanical components 106.

For example, in the embodiment shown in FIG. 4, the electromechanical component 1 has a system action of increasing the cooling operation of the cooling unit 108 by 20% for a warm system state. However, in the embodiment shown in FIG. 5, the electromechanical component 2 has a system action of increasing the cooling operation of the cooling unit 108 by 15% for a warm system state. In the embodiment shown in FIG. 6, the electromechanical component 3 has a system action of increasing the cooling operation of the cooling unit 108 by 10% for a warm system state.

For, if the electromechanical component 1 was a CPU, and the electromechanical component 2 was a hard disk drive, then the CPU may need to be cooled by a greater cooling operation from the cooling unit 108 than the hard disk drive. Thus, in the warm system state, the cooling operation of the cooling unit 108 should be increased by 20% for the electromechanical component 1, when the electromechanical component 1 is the CPU. Similarly, in the warm system state, the cooling operation of the cooling unit 108 should be increased by 15% for the electromechanical component 2, when the electromechanical component 2 is the hard disk drive.

Figure 7:
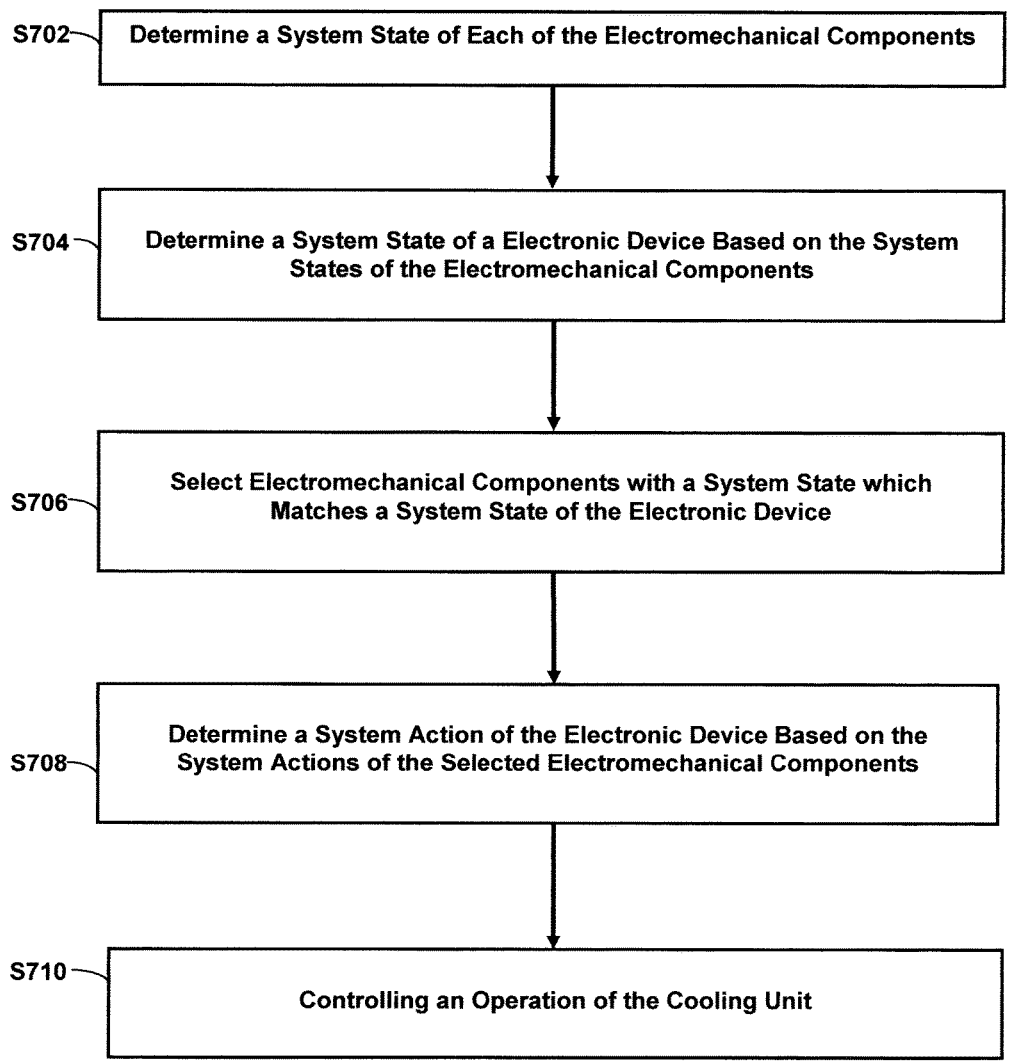
FIG. 7 depicts a process for heat removal of electromechanical components in an electronic device according to an embodiment.

In an embodiment, a process for heat removal of electromechanical components in an electronic device is shown in an embodiment in FIG. 7. In block S702, the controller 104 determines a system state of each of the electromechanical components 106. In an embodiment, the system state of each of the electromechanical components 106 is determined based on temperature data for each of the electromechanical components 106 and a temperature band corresponding to each of the electromechanical components 106. In an embodiment, the temperature data for an electromechanical component can be gathered through one or more temperature diodes placed directly on the electromechanical component or adjacent the electromechanical component. In an embodiment, other temperature monitoring systems may be used in addition or instead of the temperature diodes to gather the temperature data of the electromechanical components 106.

In an embodiment, the temperature data for each of the electromechanical components 106 is sampled at a sample rate corresponding to each of the electromechanical components 106. For example, as shown in the embodiment in FIG. 8, each of the electromechanical components 106 comprises a corresponding sample rate and a corresponding temperature band. The sample rates and the temperature bands depicted in the embodiment in FIG. 8 are merely examples, and could be altered depending on the electromechanical component. Furthermore, in an embodiment, the sample rates or the temperature bands need not remain static, but can be adjusted based on the requirements of the electronic device 102 or each of the electromechanical components 106. In addition, in an embodiment, the samples rates or the temperature bands may also be adjusted based on user preference.

In an embodiment, the different sample rates reflect the different rate of temperature fluctuations for each of the electromechanical components 106. For example, if the electromechanical component 1 comprises a CPU, then the temperature of the electromechanical component 1 might fluctuate rapidly. However, if the electromechanical component 2 comprises a hard disk drive, then the temperature of the electromechanical component 2 might fluctuate slowly. Thus, the electromechanical component 1 might be sampled at a higher rate than the electromechanical component 2. In an embodiment, the sample rate corresponding to each of the electromechanical components 106 is based on a thermal time constant of the corresponding electromechanical component. In an embodiment, the use of the thermal time constant provides for a more accurate temperature data of the electromechanical components 106.

In an embodiment, the sample rate and/or the thermal time constant corresponding to each of the electromechanical components 106 is based on a thermal mass of the electromechanical component. For example, an electromechanical component with a low thermal mass may have temperatures which fluctuate rapidly. Thus, a higher sample rate may be utilized to have more accurate temperature data. In contrast, an electromechanical component with a high thermal mass may have temperatures which do not fluctuate rapidly. Thus, a lower sample rate may be sufficient to have accurate temperature data.

Similarly, the corresponding temperature band for each for each of the electromechanical components 106 reflects the desired operating temperature for each of the corresponding electromechanical components 106.

In block S704, the controller 104 determines a system state of the electronic device 102 based on the system states of the electromechanical components. In an embodiment, the controller 104 determines a system state of the electronic device 102 based on a highest ranked system state of the electromechanical components 106. For example, if the electromechanical components 1 and 2 have a system state of a content system state, but the electromechanical component 3 has a system state of a warm system state, then the controller 104 determines that the system state of the electronic device 102 is the warm system state since the warm system state is ranked higher than the content system state.

In block S706, the controller 104 selects electromechanical components 106 with a system state which matches a system state of the electronic device 102. For example, if the system state of the electronic device 102 is a warm system state, and only the electromechanical components 1 comprises a warm system state, then the electromechanical component 1 is selected by the controller 104. However, if the electromechanical components 1 and 2 comprise a warm system state, then the electromechanical components 1 and 2 are selected by the controller 104.

In block S708, the controller 104 determines a system action of the electronic device 102 based on the system actions of the selected electromechanical components 106. In an embodiment, the controller 104 determines system actions corresponding to the selected electromechanical components 106 and determines a system action for the electronic device 102 based on the system actions corresponding to the selected electromechanical components 106. For example, if the system state of the electronic device 102 was the warm system state, and if the selected electromechanical components were the electromechanical component 1 and the electromechanical component 2, then the available system actions would comprise increasing the cooling operation by 20% (FIG. 4) or increasing the cooling operation by 15% (FIG. 5).

In such a case, the controller 104 can determine which of the two system actions to perform through an arbitration method, or which of the system actions is the highest ranked system action. For example, increasing the cooling operation by 20% may rank higher than increasing the cooling operation by 15%. In an embodiment, the controller 104 may opt to set the system action of the electronic device to the highest ranked system action corresponding to the selected electromechanical devices 106. In such a case, the controller 104 may opt to set the system action for the electronic device 102 to increase the cooling operation by 20%.

In block S710, the controller 104 controls an operation of the cooling unit 108. In an embodiment, the controller 104 controls an operation of the cooling unit 108 based on a system state of the electronic device 102. For example, the controller 104 can control the operation of the cooling unit 108 based on the system action corresponding to the system state of the electronic device 102 as shown in an embodiment in FIG. 2.

Alternatively, in an embodiment, the system action of the electronic device 102 can be based on one or more system actions of the electromechanical components 106 as disclosed above. For example, one or more system actions of the electromechanical components 1-3 shown in the embodiment in FIGS. 4-6 may be utilized by the controller 104 in controlling the cooling unit 108.

Figure 9:
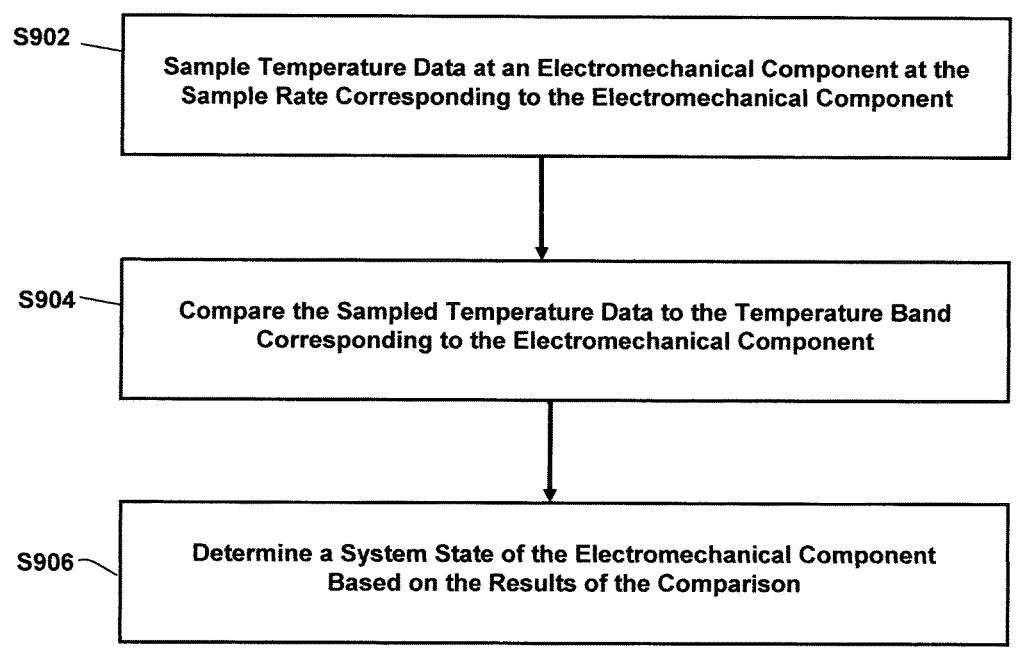
FIG. 9 depicts additional or optional blocks for a process for heat removal of electromechanical components in an electronic device according to an embodiment.

In an embodiment, additional, or optional, blocks for a process for heat removal of electromechanical components in an electronic device is shown in an embodiment in FIG. 9. In block S902, the controller 104 samples temperature data at an electromechanical component 106 at the sample rate corresponding to the electromechanical component 106. For example, the sample rates of the electromechanical components 1-3 are shown in an embodiment in FIG. 8. In block S904, the controller 104 compares the sampled temperature data to the temperature band corresponding to the electromechanical component 106. For example, the temperature bands of the electromechanical components 1-3 are shown in an embodiment in FIG. 8. In block S906, the system state of the electromechanical component may be determined, based on the results of the comparison.

In an embodiment, the electronic device 102 comprises a cooling system. In an embodiment, the cooling system in the electronic device 102 comprises one or more of the controller 104, the electromechanical components 106, the cooling unit 108, or the memory 110.

In an embodiment, the cooling unit 108 can be replaced by or supplemented by a heating unit. The cooling system can then be, for example, a heating system. In such a case, the system state and the system actions may be replaced by system states and system actions which relate to heat input to the electromechanical components 106. For example, in the embodiment shown in FIG. 2, the hot system state may instead be replaced by a cold system state. The corresponding system action may instead comprise setting the heating operation to maximum. The warm system state may instead be replaced by a cool system state. The corresponding system action may instead comprise recommending increasing a heating operation. The content system state may remain the same, but the corresponding system action may instead be replaced by maintaining the heating operation. The cool system state may instead be replaced by a warm system state. The corresponding system action may instead comprise recommending decreasing the heating operation. Similar adjustments may also be made to the embodiments shown in FIGS. 4-6.

In an embodiment, a temperature modification system may be utilized in the electronic device 102. The temperature modification system can comprise at least one of a cooling system or a heating system. Furthermore, the temperature modification system may comprise a temperature modification unit. In an embodiment, the temperature modification unit comprises at least one of a cooling unit 108 or a heating unit. The temperature modification unit can be configured for heat removal or input of the electromechanical components 106.

Thus, in an embodiment, the temperature modification system can perform similar operations as the cooling system when the temperature modification system comprises a cooling system, or the heating system when the temperature modification system comprises a heating system as disclosed above. Furthermore, in an embodiment, the temperature modification input can perform similar operations as the cooling unit 108 when the temperature modification unit comprises the cooling unit 108, or the heating unit when the temperature modification unit comprises the heating unit.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. An electronic device comprising:
   electromechanical components;
   a memory configured to store, for each of the electromechanical components, a plurality of predetermined temperature states, a plurality of system actions associated with the plurality of predetermined temperature states, and a ranking of the system actions;
   a cooling unit configured to remove heat from the electromechanical components; and
   a controller configured to:
   determine an individual temperature state for each of the electromechanical components based on temperature data for each of the electromechanical components and a temperature band corresponding to each of the electromechanical components, wherein:
   each determined individual temperature state is one of the plurality of predetermined temperature states;
   at least one of the determined individual temperature states is different from at least one other of the determined individual temperature states;
   each of the electromechanical components is sampled at an individual sample rate based at least partly on a temperature fluctuation rate of each of the electromechanical components, as determined through a thermal time constant related to a thermal mass of a corresponding electromechanical component;
   and
   the temperature data for each of the electromechanical components is sampled at the individual sample rate corresponding to each of the electromechanical components;
   during overheating and non-overheating operation of the electronic device, assign a device temperature state to the electronic device based on a highest ranked temperature state of the determined individual temperature states;
   and
   responsive to at least a first electromechanical component and a second electromechanical component having individual temperature states that match the assigned device temperature state:
   determine a first system action and a second system action associated with the first electromechanical component and the second electromechanical component, respectively, wherein the first system action and the second system action are different for a same determined individual temperature state;
   determine a device system action for the electronic device by selecting one of the first system action or the second system action based on the ranking of the system actions;
   and
   control an operation of the cooling unit based on the determined device system action.

2. The electronic device of claim 1, wherein the controller is configured to determine the device system action by:
   determining a highest ranked system action of the first system action and the second system action.

3. The electronic device of claim 1, wherein the device system action comprises one of: shutting down the electronic device, displaying a warning, throttling a performance of the electronic device, operating the cooling unit at a maximum cooling operation, increasing a cooling operation of the cooling unit, maintaining a cooling operation of the cooling unit, or decreasing a cooling operation of the cooling unit.

4. The electronic device of claim 1, wherein the individual temperature state for each of the electromechanical components is stored in an array in the memory.

5. The electronic device of claim 1, wherein the cooling unit comprises a fan.

6. The electronic device of claim 1, wherein the electromechanical components comprise at least one of a central processing unit, a random access memory, a magnetic rotating disk, or a solid state memory.

7. The electronic device of claim 1, wherein the ranking comprises a ranking of the individual temperature states and corresponding system actions.

8. The electronic device of claim 1, wherein a sample rate and an applicable temperature band for that sample rate are stored in the memory for each of the electromechanical components.

9. A method for removing heat from electromechanical components in an electronic device, the method comprising:
   storing in the electronic device, for each of the electromechanical components, a plurality of predetermined temperature states, a plurality of system actions associated with the plurality of predetermined temperature states, and a ranking of the system actions;

determining an individual temperature state for each of the electromechanical components based on temperature data for each of the electromechanical components and a temperature band corresponding to each of the electromechanical components using a controller in the electronic device, wherein:

each determined individual temperature state is one of the plurality of predetermined temperature states;

at least one of the determined individual temperature states is different from at least one other of the determined individual temperature states;

each of the electromechanical components is sampled at an individual sample rate based at least partly on a temperature fluctuation rate of each of the electromechanical components, as determined through a thermal time constant related to a thermal mass of a corresponding electromechanical component;

and the temperature data for each of the electromechanical components is sampled at the individual sample rate corresponding to each of the electromechanical components;

during overheating and non-overheating operation of the electronic device, assigning a device temperature state of the electronic device based on a highest ranked temperature state of the determined individual temperature states;

and responsive to at least a first electromechanical component and a second electromechanical component having individual temperature states that match the assigned device temperature state of the electronic device:

determining a first system action and a second system action associated with the first electromechanical component and the second electromechanical component, respectively, wherein the first system action and the second system action are different for a same determined individual state; determining a device system action for the electronic device by selecting one of the first system action or the second system action based on the ranking of the system actions; and controlling an operation of a cooling unit in the electronic device based on the determined device system action.

10. The method of claim 9, wherein determining the device system action comprises:

determining a highest ranked system action between the first electromechanical component and the second electromechanical component as the device system action.

11. The method of claim 9, wherein the device system action comprises one of: shutting down the electronic device, displaying a warning, throttling a performance of the electronic device, operating the cooling unit at a maximum cooling operation, increasing a cooling operation of the cooling unit, maintaining a cooling operation of the cooling unit, or decreasing a cooling operation of the cooling unit.

12. The method of claim 9, wherein the electronic device further comprises memory accessible by the controller.

13. The method of claim 12, further comprising storing the individual temperature state for each of the electromechanical components in an array in the memory.

14. A temperature modification system for an electronic device, the system comprising:

a temperature modification unit configured to add heat to or remove heat from electromechanical components in the electronic device;

a memory configured to store, for each of the electromechanical components, a plurality of predetermined temperature states, a plurality of system actions associated with the plurality of predetermined temperature states, and a ranking of the system actions;

and a controller configured to:

determine an individual temperature state for each of the electromechanical components based on temperature data for each of the electromechanical components and a temperature band corresponding to each of the electromechanical components, wherein:

each determined individual temperature state is one of a set of predetermined temperature states;

at least one of the determined individual temperature states is different from at least one other of the determined individual temperature states;

each of the electromechanical components is sampled at an individual sample rate based at least partly on a temperature fluctuation rate of each of the electromechanical components, as determined through a thermal time constant related to a thermal mass of a corresponding electromechanical component;

and the temperature data for each of the electromechanical components is sampled at the individual sample rate corresponding to each of the electromechanical components;

during overheating and non-overheating operation of the electronic device, assign a device temperature state of the electronic device based on a highest ranked temperature state of the determined individual temperature states; and responsive to at least a first electromechanical component and a second electromechanical component having individual temperature states that match the assigned device temperature state:

determine a first system action and a second system action associated with the first electromechanical component and the second electromechanical component, respectively, wherein the first system action and the second system action are different for a same determined individual state;

determine a device system action for the electronic device by selecting one of the first system action or the second system action based on the ranking of the system actions;

and control an operation of the temperature modification unit based on the determined device system action.

15. The system of claim 14, wherein the controller is configured to determine the device system action by:

determining a highest ranked system action of the first system action and the second system action.

16. The system of claim 14, wherein the device system action comprises one of: shutting down the electronic device, displaying a warning, throttling a performance of the electronic device, operating the temperature modification unit at a maximum cooling operation, increasing a cooling or heating operation of the temperature modification unit, maintaining a cooling or heating operation of the temperature modification unit, or decreasing a cooling or heating operation of the temperature modification unit.

17. The system of claim 14, wherein the individual temperature state for each of the electromechanical components is stored in an array in the memory.

18. The system of claim 14, wherein the temperature modification unit comprises at least one of a cooling unit and a heating unit.

19. The system of claim 14, wherein the electromechanical components comprise at least one of a central processing unit, a random access memory, a magnetic rotating disk, or a solid state memory.

* * * * *